(12) United States Patent
Vaidya et al.

(10) Patent No.: US 6,870,809 B1
(45) Date of Patent: Mar. 22, 2005

(54) FAIR SCHEDULING IN BROADCAST ENVIRONMENTS

(75) Inventors: Nitin Vaidya, Blue Bell, PA (US); Paramvir Bahl, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/415,901

(22) Filed: Oct. 8, 1999

(51) Int. Cl.[7] .......................................... H04L 12/413
(52) U.S. Cl. .................................. 370/229; 370/448
(58) Field of Search ................................ 370/235, 429, 370/448, 445, 447, 910, 229, 230, 232, 233, 234, 238, 400, 401, 412, 413, 415, 449, 468, 477

(56) References Cited

U.S. PATENT DOCUMENTS

| | | | |
|---|---|---|---|
| 3,878,512 A | * 4/1975 | Kobayashi et al. | 370/445 |
| 4,412,326 A | * 10/1983 | Limb | 370/448 |
| 4,561,092 A | * 12/1985 | Shaver | 709/235 |
| 5,058,108 A | 10/1991 | Mann et al. | |
| 5,268,899 A | * 12/1993 | Brown | 370/448 |
| 5,311,172 A | * 5/1994 | Sadamori | 370/448 |
| 5,353,287 A | * 10/1994 | Kuddes et al. | 709/238 |
| 5,402,420 A | * 3/1995 | Kobayashi | 370/448 |
| 5,636,223 A | * 6/1997 | Reardon et al. | 370/431 |
| 5,699,515 A | * 12/1997 | Berkema et al. | 370/448 |
| 5,784,375 A | 7/1998 | Kalkunte et al. | |
| 5,831,971 A | * 11/1998 | Bonomi et al. | 370/230 |
| 5,850,525 A | 12/1998 | Kalkunte et al. | |
| 5,894,559 A | 4/1999 | Krishna et al. | |
| 5,905,730 A | * 5/1999 | Yang et al. | 370/429 |
| 5,910,956 A | * 6/1999 | Guthrie et al. | 370/445 |
| 5,991,295 A | * 11/1999 | Tout et al. | 370/395.7 |
| 6,320,858 B1 | * 11/2001 | King et al. | 370/212 |
| 6,459,704 B1 | * 10/2002 | Jandrell | 370/390 |

FOREIGN PATENT DOCUMENTS

WO    WO 93/01668 A1    1/1993

OTHER PUBLICATIONS

S. Floyd, V. Jacobson, Random Early Detection Gateways for Congestion Avoidance, IEEE/ACM Transactions on Networking, vol. 1, No. 4, 397–413, Aug. 1, 1993.

D. Lin, R. Morris, Dynamics of Random Early Detection, Procs. of SIGCOMM '97, pp. 127–137, Sep. 1, 1997.

T.S. Ng, I. Stoica, H. Zhang, Packet Fair Queueing Algorithms for Wireless Networks with Location–Dependent Errors, INFOCOM, Mar. 1, 1998.

S. Lu, T. Nandagopal, V. Bharghavan, A Wireless Fair Service Algorithm for Packet Cellular Networks, ACM MobiCom, Jan. 1, 1998.

S. Lu, T. Nandagopal, V. Bharghavan, Design and Analysis of an Algorithm for Fair Service in Error–Prone Wireless Channels, Wireless Networks, Feb. 1, 1999.

V. Bharghavan, S. Lu, T. Nandagopal, Fair Queuing in Wireless Networks: Issues and Approaches, IEEE Personal Communications Magazine, Feb. 1, 1999.

(List continued on next page.)

Primary Examiner—Huy D. Vu
Assistant Examiner—Daniel Ryman
(74) Attorney, Agent, or Firm—Leydig, Voit & Mayer, Ltd.

(57) ABSTRACT

Fair scheduling in broadcast environments is disclosed. In one embodiment, a computerized system includes a link through which packets are transmitted, and a plurality of nodes. Each node transmits a packet through the link when counting from a back-off interval reaches a predetermined transmission time. The back-off interval for each packet is based on at least a start tag of the packet, which is assigned to the packet when it arrives at or within the node for transmission over the link, such as at a controller (e.g., a medium-access controller, or MAC) of the node.

11 Claims, 6 Drawing Sheets

OTHER PUBLICATIONS

G. Nandagopal, S. Lu, V. Bharghavan, A. Unified Architecture for the Design and Evaluation of Wireless Fair Queueing Algorithms, ACM MobiCom, Aug. 1, 1999.

S. Lu, V. Bharghavan, R. Srikant, Fair Scheduling in Wireless Packet Networks, ACM SIGCOMM, Jan. 1, 1997.

P. Goyal, H.M. Vin, H. Cheng, Start–time Fair Queuing: A Scheduling Algorithm for Integrated Services Packet Switching Networks, IEEE/ACM Transactions on Network, vol. 5, pp. 690–704, Oct. 1, 1997.

P. Ramanathan, P. Agrawal, Adapting Packet Fair Queueing Algorithms to Wireless Networks, ACM MobiCom, Jan. 1, 1998.

J.L. Sobrinho, A.S. Krishnakumar, Real–time traffic over the IEEE 802.11 MAC layer, Bell Labs Technical Journal, pp. 172–187, Oct. 1, 1996.

J.L. Sobrinho, A.S. Krishnakumar, Quality of Service in Ad Hoc Carrier Sense MA Networks, IEEE Journal of Selected Areas in Comms, vol. 17, pp 1353–1368, Aug. 1999.

IEEE, Wireless LAN MAC and PHY Specifications, IEEE Standard 802.11, 1999 Edition.

* cited by examiner

FAIR SCHEDULING IN BROADCAST ENVIRONMENTS

FIELD OF THE INVENTION

This invention relates generally to broadcast environments such as wired and wireless networks, multi-hop networks, etc., and more particularly to fair scheduling for data transmission within such environments.

BACKGROUND OF THE INVENTION

Broadcast environments include environments in which information is transmitted from discrete originating points over a common medium, and include environments such as networking environments, which have become increasingly common. Networking means that two or more computers or computerized devices, referred to generically as nodes, are communicatively coupled together, so that they can exchange data, typically in the form of packets of data. Networking includes wired local-area-networks (LAN's), in which nodes are connected physically over relatively short distances, wireless LAN's, in which nodes communicate wirelessly over relatively short distances, and multi-hop networks, in which nodes communicate with other nodes on the network, using intermediate nodes to forward their messages.

The amount of data that a network can handle at a given moment in time is referred to as bandwidth. For example, the commonly known Ethernet network generally comes in two different speeds: 100 megabits-per-second (mbps) and 10 megabits-per-second (mbps). This means that, per second, the network is able to accommodate either 100 megabits or 10 megabits of data.

An issue in broadcast environments, such as the ones described above, is determining which node gets to communicate at a given time. Algorithms and schemes to determine which node gets to communicate at a given time typically also concern themselves with fairness. Fairness can be defined in different ways. For example, fairness can mean that each node on the network has a predetermined percentage of the available bandwidth on the network over a given duration of time, a predetermined priority relative to the other nodes on the network, or a weight to divide the available network bandwidth relative to the other nodes. In addition, fairness can mean that a predefined Quality of Service (QOS) is guaranteed for one or more given nodes on the network. A non-restrictive example of QOS is that a given node is guaranteed to receive x amount of bandwidth within γ amount of time after the node requests to transmit data over the network.

Within the prior art, fairness has generally been implemented by randomizing the time at which different nodes compete for the broadcast channel to transmit their data. The theory is that by randomizing the time, the nodes on the network will pick generally different times to transmit and consequently each will get a chance to transmit its data. While such randomization techniques improve the probability that, over a long period of time, every node gets an opportunity to use the channel, they generally result in poor performance when nodes have to transmit time-constrained data, such as voice and video. For this and other reasons, there is a need for the present invention.

SUMMARY OF THE INVENTION

The invention relates to fair scheduling in broadcast environments. In one embodiment, a computerized system includes a link through which packets, such as packets of data, are transmitted, and a plurality of nodes, such as computers or computerized devices in a wireless or wired local-area network (LAN) or multi-hop network configuration. Each node is able to transmit a packet through the link when it has counted down its back-off interval to a predetermined transmission time, such as zero. The back-off interval for each packet is based on at least a start tag of the packet, which is assigned to the packet when it arrives at or within the node for transmission over the link, such as at a controller (e.g., a medium-access controller, or MAC) within the node, from, for example, an application computer program or programs within the node.

Embodiments of the invention provide for advantages not found within the prior art. The tagging of packets with start tags upon their arrival at or within the node and subsequently using these tags to schedule transmission over the link provides for fair scheduling among the nodes. Such fair scheduling means that each node will eventually have its turn to transmit information over the link. Furthermore, the use of appropriate back-off interval means that a certain level of Quality of Service (QOS) can be provided to one or more of the nodes on the network.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
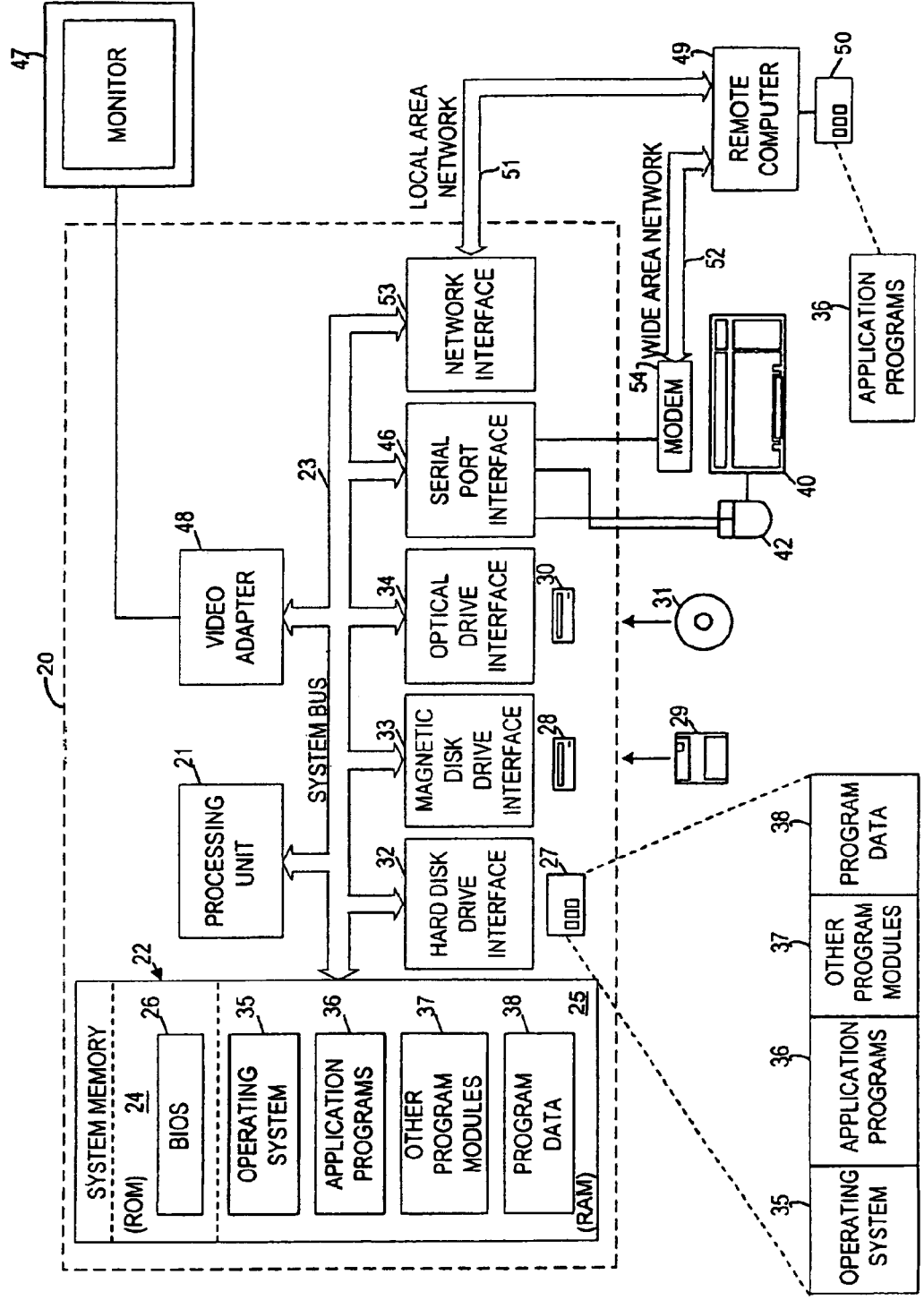
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Broadcast Environments

In this section of the detailed description, representative broadcast environments, in conjunction with which embodiments of the invention can be practiced, are described. However, those of ordinary skill within the art can appreciate that the invention is not limited to any particular broadcast environment or the set of broadcast environments described herein. Specifically, three example broadcast environments are described: a wired local-area network (LAN), a wireless LAN, and a wireless, multi-hop network.

Figure 2A:
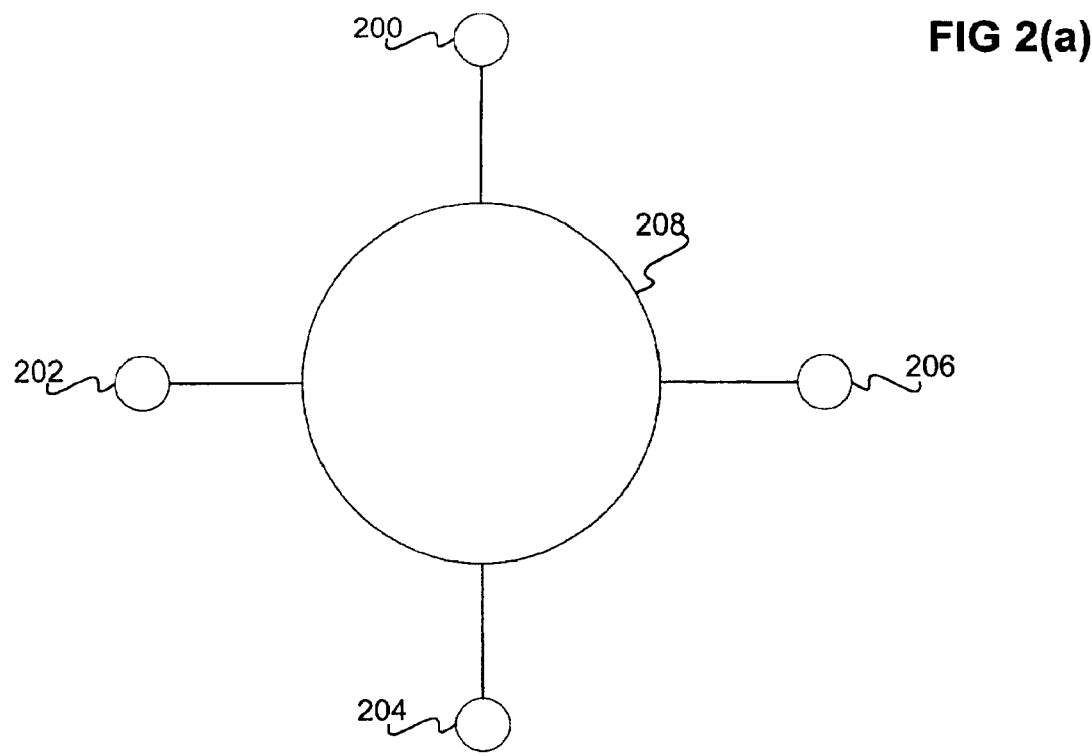
FIGS. 2(a)–2(c) are diagrams of example broadcast environments in conjunction with which embodiments of the invention can be practiced.

Referring first to FIG. 2(a), a diagram of a wired LAN is shown. The LAN 208 includes nodes 200, 202, 204 and 206. The nodes are connected to one another in a physical manner. For example, cables can connect the nodes to one another. The LAN 208 has the characteristic that any node is able to communicate with any other node in the network in a direct manner. Example nodes include computers, such as that described in the previous section of the detailed description, as well as computerized devices, such as cell phones, personal digital assistant (PDA) devices, etc.; the invention is not so limited.

Figure 2B:
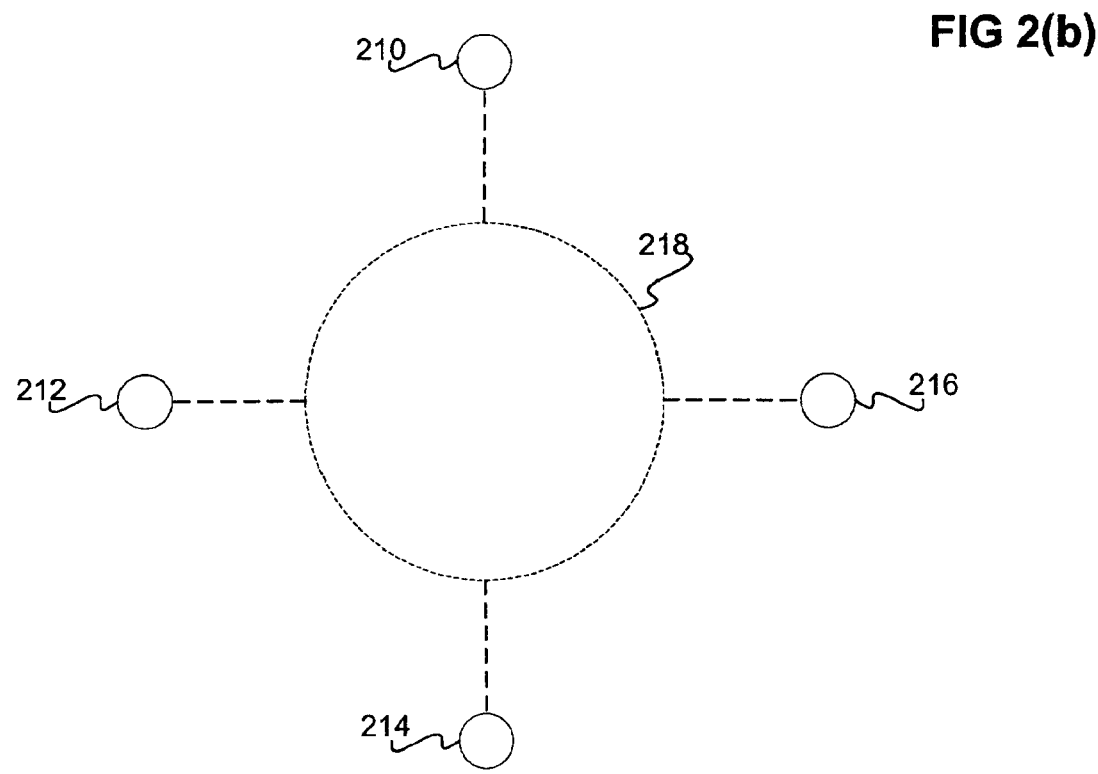

Referring next to FIG. 2(b), a diagram of a wireless LAN is shown. Similar to the LAN 208 of FIG. 2(a), the LAN 218 includes nodes 210, 212, 214 and 216. However, in the diagram of FIG. 2(b), the nodes communicate with one another in a wireless manner. For example, each node can include a transceiver such that the node is able to send information over a radio frequency (RF), such as the commonly used 2.4 GHz frequency, although the invention is not so limited. The LAN 218 also has the characteristic that any node is able to communicate with any other node in the network in a direct manner. Example nodes include computers, such as that described in the previous section of the detailed description, as well as computerized devices, such as cell phones, personal digital assistant (PDA) devices, etc.; the invention is not so limited.

Figure 2C:
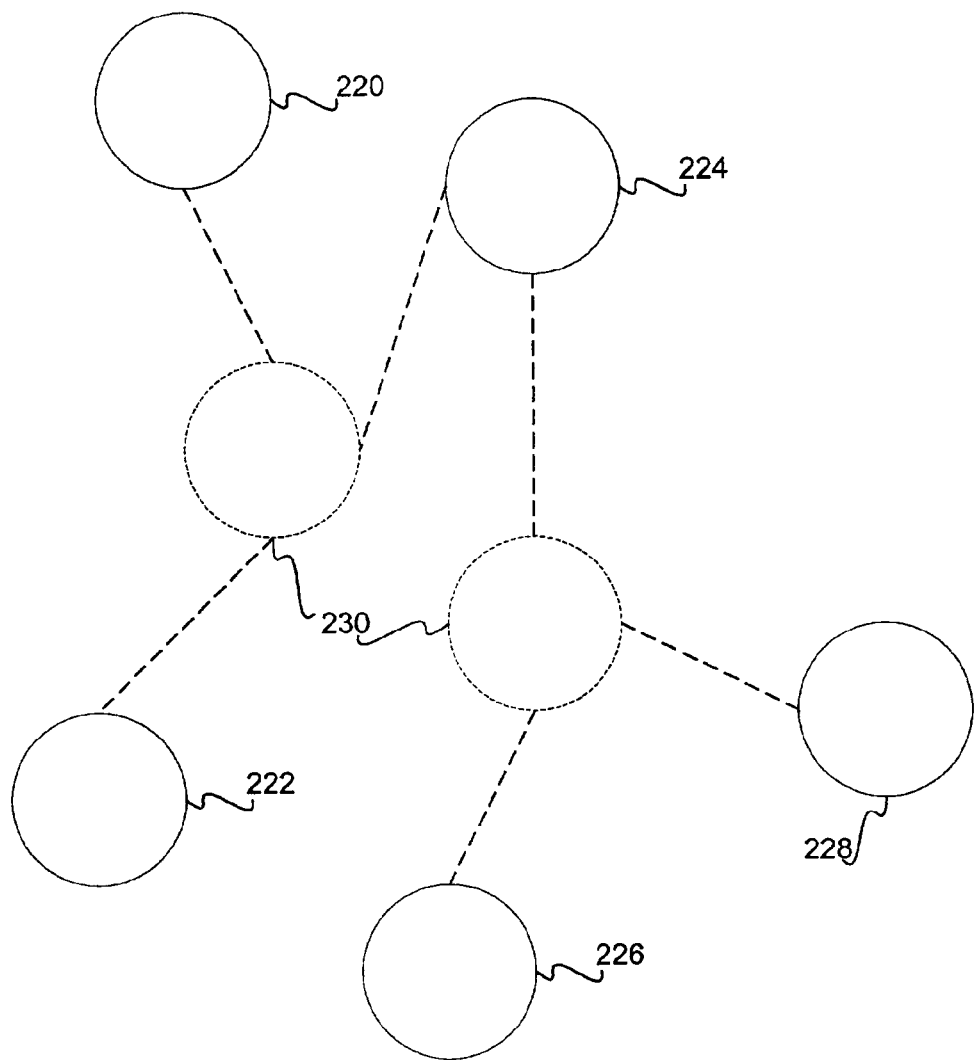

Referring next to FIG. 2(c), a diagram of a wireless multi-hop network is shown. The network 230 includes nodes 220, 222, 224, 226 and 228. The nodes communicate with one another in a wireless manner, such as that described in the previous paragraph in conjunction with the description of a wireless LAN. It is noted, however, in the network of FIG. 2(c), that not each node is able to communicate directly with every other node, which is the defining characteristic of a multi-hop network. For example, the node 222 is able to communicate directly with nodes 220 and 224, but not with nodes 226 and 228. Rather, communication between the node 222 and the nodes 226 and 228 must "hop" through node 224. This may be because, for example in the case of wireless communication among the nodes, the node 222 has sufficient communicative range to reach nodes 220 and 224, but not nodes 226 and 228. Example nodes, as before, include computers, such as that described in the previous section of the detailed description, as well as computerized devices, such as cell phones, personal digital assistant (PDA) devices, etc.; the invention is not so limited.

Figure 3:
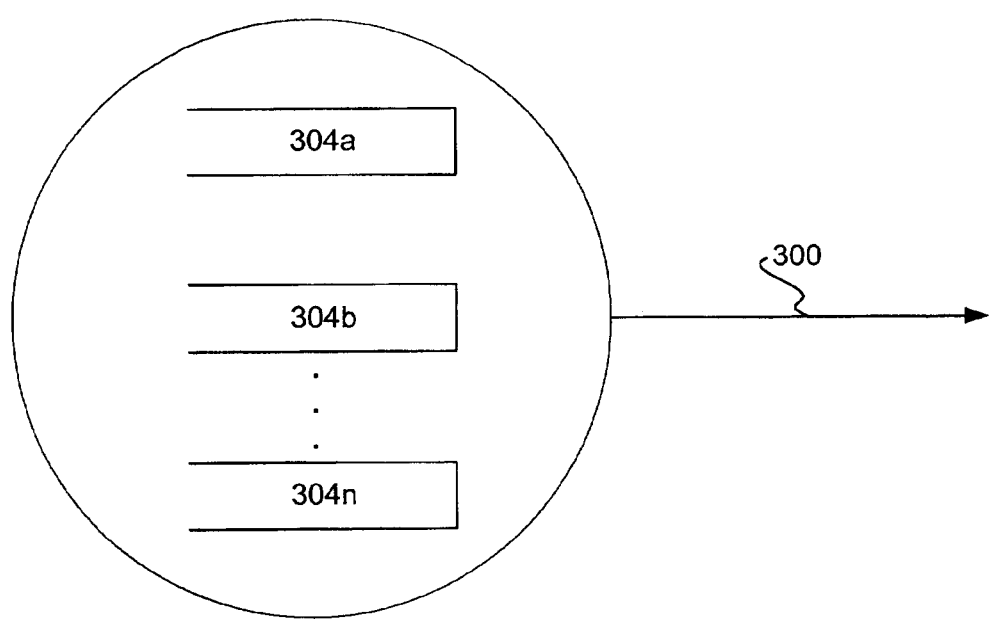
FIG. 3 is a diagram of an abstraction of a broadcast environment, according to an embodiment of the invention.

Referring finally to FIG. 3, a diagram of an abstraction of a broadcast environment, such as the broadcast environment of FIG. 2(a), or FIG. 2(b), is shown. In the example, there are flows 304a, 304b, . . . , 304n, which correspond to the nodes of FIGS. 2(a), or 2(b). The link 300 corresponds to the network of FIGS. 2(a), or 2(b). The abstraction of FIG. 3 is useful because it shows that when a node, that is, a flow, wishes to transmit a packet of data over a network, that is, a link, the link is commonly shared among all the nodes or flows. Thus, a scheme must be put into place such that all the nodes do not attempt to send packets of data at the same time, else a collision may occur. As described in the background and summary sections, however, the scheme is desirably such that some definition of fairness is achieved as to dividing the bandwidth of the link over the various flows that wish to send data packets thereover.

Method

In this section of the detailed description, a method for distributed fair scheduling of packet transmission among nodes within a network, according to one embodiment of the invention, is described. The method described is distributed in that the method achieves fair scheduling and Quality of Service (QOS) without having a central management node, or other central managing mechanism, coordinating data transmission among the various nodes of the network. As described herein, the method is performed on each node of a network that desires to send packets, such as of data, over the network, as can be abstracted as a link, as described in the previous section of the detailed description. The method achieves scheduling fairness and QOS, while reducing the occurrence of collisions, defined generally as two or more nodes attempting to transmit data over the network at the same time.

The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Figure 4:
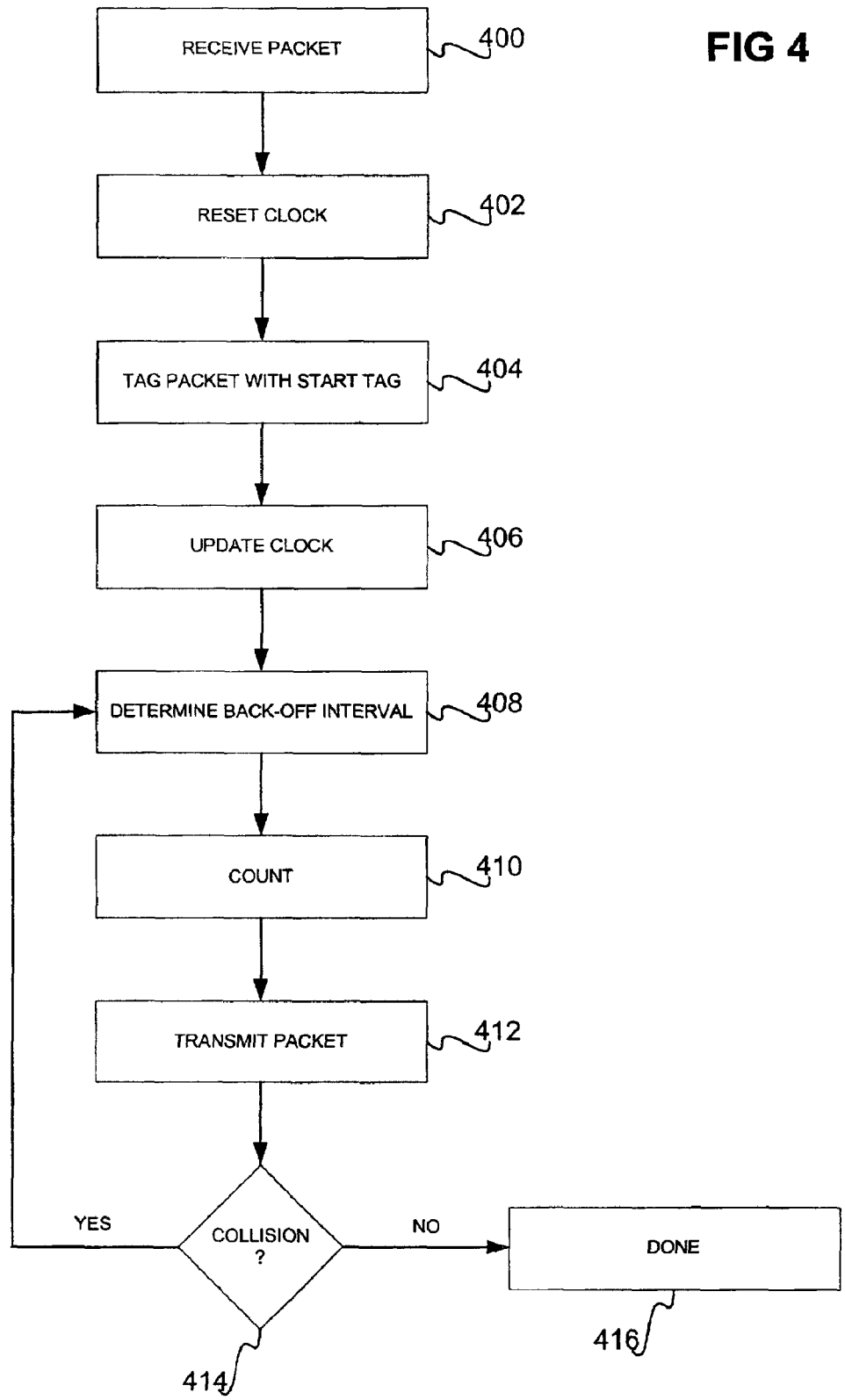
FIG. 4 is a flowchart of a method according to an embodiment of the invention; and, FIG. 5 is a diagram of a computer according to an embodiment of the invention.

Referring now to FIG. 4, a flowchart of a method according to an embodiment of the invention is shown. The method is performed by each node within a broadcast environment. In 400, a packet, for example, a packet of data, is received at the node for transmission therefrom, through the link or network coupling all the nodes, or from an application running on the node. In 402, a virtual clock is reset to zero. The virtual clock is a clock maintained by each node within the network. In this embodiment, it is reset only once each time a packet is received. The virtual clock is written as $v_i(t)$, where t is actual, physical time—for example, as maintained by a real-time clock within the node—and I specifies the node. Thus, the resetting of the virtual clock to zero in 402 is written as $v_i(t)=0$.

In 404, the packet is tagged with a start tag. The start tag is a function of the time when the packet arrives at the node. The packet itself is denoted as $P_i^k$, where P is the packet, i indicates the node, and k indicates the k-th packet received at the node. The tag is specified as $S_i^k$ and determined as $$S_i^k = \max\{v(A_i^k), F_i^k - 1\},$$

where $A_i^k$ specifies the real time at which packet $P_i^k$ arrives at node i, and $F_i^k-1$ specifies the finish tag of the previous packet. The finish tag of a packet is determined as $$F_i^k = S_i^k + \gamma \frac{L_i^k}{w_i},$$

where $L_i^k$ specifies the length of the packet and $w_i$ specifies weight of node i, higher weight is given to nodes that require a greater share of the bandwidth. $\gamma$ is the scaling factor used to allow a choice of the scale for the virtual clock.

In 406, the virtual clock is updated. It is noted that the virtual clock is updated only when a packet is transmitted from a node onto the link. Thus, if at time t, a packet is in service, then $v_i(t)$ is updated to $$v_i(t) = \max(v_i(t), s)$$

where s is the start tag of the packet in service. It is noted that the virtual clock is not updated at any other time in one embodiment.

Once a node i desires to transmit the packet, then in 408, it determines an appropriate back-off interval, which is generally defined as the length of time the node waits until actually transmitting the packet onto the link. This interval is denoted as $B_i$, and is based on the start tag and the current virtual time $v_i(t)$ in one embodiment. Specifically, $$B_i = \lceil \eta*(S_i^k - v_i(t)) \rceil$$

where $\eta$, the Backoff_Multiplier is a constant in one embodiment.

It is noted that because of the manner in which the start tags and the virtual clock are determined, $B_i$ is non-negative. However, if the start tag and the virtual clock are identical, $B_i$ may become equal to zero. To avoid this, in one embodiment, $B_i$ is further modified as $$B_i = B_i + X,$$

where X is uniformly distributed in $[1, \beta]$ where $\beta$, the Backoff_Window, is a positive integer. This further reduces the probability of back-off intervals of two nodes counting down to zero at the same time, in 408 as well the back-off counter is reset to zero after this step is performed.

The node then starts counting from the back-off interval to a predetermined transmission time, such as zero, in 410; that is, the node does not actually send the packet until the predetermined transmission time is reached in 410, as counted down from the back-off interval. Thus, in 412, the node has counted down from the back-off interval to the predetermined transmission time, and therefore transmits the packet over the network or link. At this time, the node also tags the packet with a finish tag, as determined as has been described.

In 414, it listens to determine whether another node has sent a packet at exactly the same time, such that a collision resulted. If not, then the method is done in 416. It is noted that in this case, when another packet needs transmission via the method of FIG. 4, that the virtual clock will not be reset in 402, since it is only reset once. However, if a collision has resulted, then a new back-off interval ($B_i$) must be determined, and the packet ultimately resent. Thus, the method goes back to 408. However, in this iteration of 408, the back-off counter is increased by one, to indicate that the back-off interval ($B_i$) has already been determined once, and a new back-off interval is selected, uniformly distributed in $$[1, 2^{backoff\_counter-1}*\beta],$$

This new determination of the back-off interval is used if future iterations are necessary —that is, if any more collisions result.

It is noted that this back-off interval is small. This is done to increase the probability that a colliding node "wins" the back-off interval countdown as against the other nodes, so that a collision does not result in unduly delaying the transmission of the packet. However, to minimize the occurrence of too many collisions, the range for $B_i$ increases exponentially with the number of collisions.

It is noted that the specific determination of the back-off interval for a node is not limited to the description above. Other variations are possible, in particular, to trade off between the probability that a collision may occur, and the overhead incurred by the choice of large back-off intervals. In varying embodiments, two alternatives are determining the back-off interval can be used:

1) Initially selecting a back-off interval to be linearly proportional to (start tag minus virtual time). In one embodiment, a random component is added to this value. For example, the back-off interval is selected to be uniformly distributed within 20% of (start tag minus virtual time). Such an approach is advantageous when the likelihood of many nodes choosing the same back-off interval is large.

2) As described in 1), once the back-off interval is chosen, it is decremented until it reaches the predetermined transmission time, in one embodiment, zero. A new back-off interval is not selected for a packet unless a collision occurs when its back-off interval reaches the predetermined transmission time. This approach works because the back-off interval is chosen to be linearly proportional to (start tag minus virtual time). However, where there are many nodes, there can be a case where all nodes choose large back-off intervals, such that too much time is spent idling when the back-off counters are decrementing to the predetermined transmission time. Thus, another alternative is to use a non-linear function to set the back-off interval, but emulate the relative order of back-off intervals chosen in 1). For example, a function of the form $K_1*(1-K_2^{-(start\_tag - virtual\_time)})$ is used in one embodiment. In this case, however, after each packet transmission, the back-off counter of each pending packet needs to be predetermined, so as to emulate the scheme in 1).

The method of FIG. 4 can be summarized as follows. Each node of the network may have a pending packet to be transmitted over the network. For each node that does, when the packet actually arrived at the node—for example, when the packet was generated within the node, and then "arrived" at the node for transmission by a medium access controller (MAC) of the node—the packet is stamped with a start tag, and a back-off interval is determined for the node. The nodes thus start counting down from their respective back-off intervals to zero, in one embodiment. The first node that "wins"—the first node that counts down to zero—sends its packet. This node then is able to receive another packet, and the process starts over for that node. Thus, as nodes count down to zero, they fire off their packets. The method also takes care of the situation where more than one node count down to zero at the same time, which results in a collision.

The method of FIG. 4, as one embodiment of the invention, thus provides for fair scheduling within broadcast environments.

Computer

In this section of the detailed description, a computer is described that can function as a node within a network per the method of the preceding section of the detailed description. The computer can be based on, in one embodiment, the computer of FIG. 1, as has been described. However, the invention is not so limited.

Figure 5:
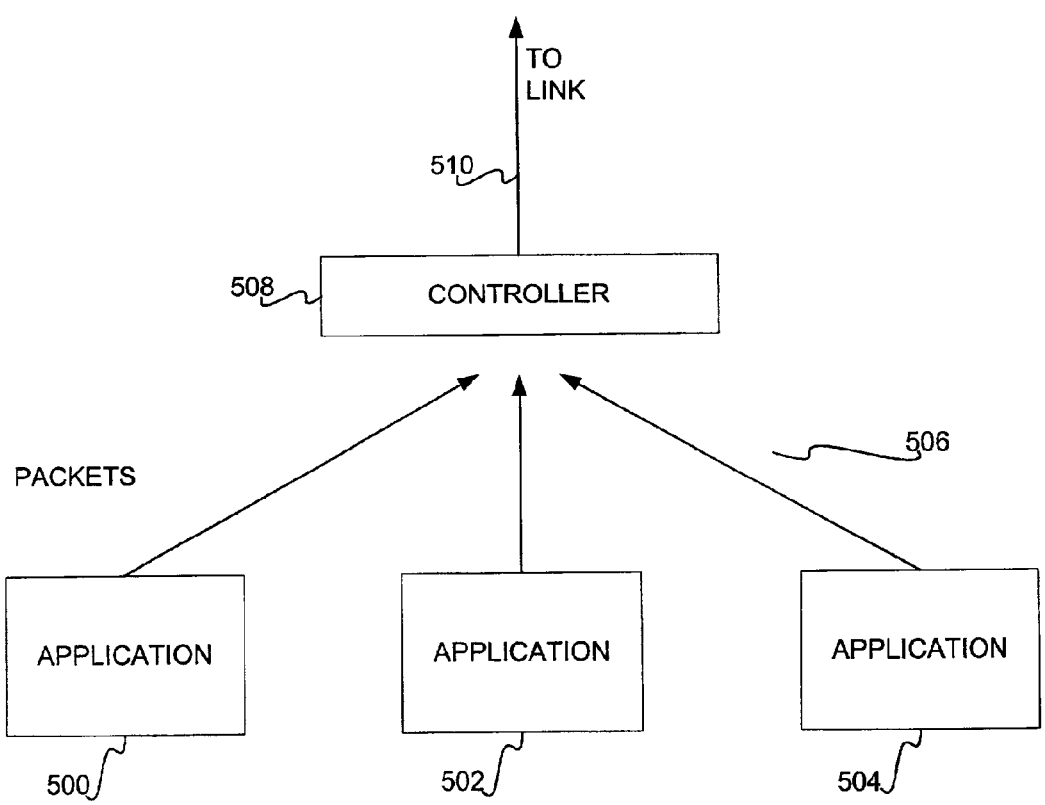

Referring now to FIG. 5, the computer includes application programs such as programs 500, 502 and 504. Each of these programs generates data packets, as represented by 506 in the diagram of FIG. 5. The packets are received at, or within, the computer specifically at the controller 508, which can be described in one embodiment as a medium access controller (MAC)— the controller which controls access to the "medium," which in this case is the network, or link. Thus, the method described in the preceding section of the detailed description is performed within the controller 508, to determine when to send a received packet to the link, as represented in FIG. 5 by 510.

Not shown in FIG. 5 is that generally there is a queue to receive packets from the application programs. In such an embodiment, a packet is received by the controller 508 from the queue, in a first in-first out (FIFO) basis, when the controller has finished transmitting a previous packet. When the queue is completely empty, the packet immediately is received by the controller 508.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A method for fair scheduling comprising:
   receiving a packet at a node;
   assigning a start tag to the received packet, the start tag based, at least in part, on a maximum of a time measured by a virtual clock when the packet was received and a finish tag of a previously received packet, wherein the finish tag is based, at least in part, on a start tag of the previously received packet; and
   transmitting the received packet at a time based, at least in part, on the assigned start tag, wherein transmitting the received packet comprises:
   attempting to transmit the received packet;
   assigning a back-off interval based, at least in part, on the assigned start tag minus a time measured by the virtual clock at a time when an attempt is made to transmit the received packet; and
   transmitting the received packet after the back-off interval has expired.

2. The method according to claim 1 wherein the virtual clock is reset only once to zero and is updated whenever a packet is transmitted on the node.

3. The method according to claim 1 further comprising updating the virtual clock in response to the received packet being transmitted, wherein the virtual clock is based, at least in part, on a maximum of a time measured by the virtual clock when the received packet was transmitted and the assigned start tag of the received packet.

4. The method according to claim 1 further comprising assigning a finish tag based, at least in part, on the assigned start tag of the received packet.

5. The method according to claim 1 further comprising assigning a finish tag based, at least in part, on the assigned start tag plus a scaling factor multiplied by a length of the received packet divided by a weight of the node.

6. A machine-readable medium having computer-executable instructions for performing steps comprising:
   receiving a packet at a node;
   assigning a start tag to the received packet, the start tag based, at least in part, on a maximum of a time measured by a virtual clock when the packet was received and a finish tag of a previously received packet, wherein the finish tag is based, at least in part, on a start tag of the previously received packet; and
   transmitting the received packet at a time based, at least in part, on the assigned start tag, wherein transmitting the received packet comprises:
   attempting to transmit the received packet;
   assigning a back-off interval based, at least in part, on the assigned start tag minus a time measured by the virtual clock at a time when an attempt is made to transmit the received packet; and
   transmitting the received packet after the back-off interval has expired.

7. The medium of claim 6 wherein the virtual clock is reset only once to zero and is updated whenever a packet is transmitted on the node.

8. The medium of claim 6 having further computer-executable instructions for updating the virtual clock in response to the received packet being transmitted, wherein the virtual clock is based, at least in part, on a maximum of a time measured by the virtual clock when the received packet was transmitted and the assigned start tag of the received packet.

9. The medium of claim 6 having further computer-executable instructions for assigning a finish tag based, at least in part, on the assigned start tag of the received packet.

10. The medium of claim 6 having further computer-executable instructions for assigning a finish tag based, at least in part, on the assigned start tag plus a scaling factor multiplied by a length of the received packet divided by a weight of the node.

11. A computer system comprising:
    an application generating a packet for transmission through a link operatively coupled to a computer; and
    a controller to receive the packet, assign a start tag for the received packet based, at least in part, on a maximum of a time measured by a virtual clock when the packet was received and a finish tag of a previously received packet, wherein the finish tag is based, at least in part, on a start tag of the previously received packet, and transmit the received packet at a time based, at least in part, on the assigned start tag, wherein transmitting the received packet comprises:
    attempting to transmit the received packet;
    assigning a back-off interval based, at least in part, on the assigned start tag minus a time measured by the virtual clock at a time when an attempt is made to transmit the received packet; and
    transmitting the received packet after the back-off interval has expired.

* * * * *

UNITED STATES PATENT AND TRADEMARK OFFICE
CERTIFICATE OF CORRECTION

PATENT NO. : 6,870,809 B1
APPLICATION NO. : 09/415901
DATED : March 22, 2005
INVENTOR(S) : Vaidya et al.

It is certified that error appears in the above-identified patent and that said Letters Patent is hereby corrected as shown below:

On the Title page, in item (75), in "Inventors", delete "Blue Bell, PA" and insert -- College Station, TX --, therefor.

On page 2, in field (56), under "Other Publications", in Column 1, line 1, after "A" delete ".".

In column 1, line 50, delete "γ" and insert -- y --, therefor.

In column 3, line 24, delete "systern's" and insert -- system's --, therefor.

In column 6, line 5, delete "FIGS." and insert -- FIG. --, therefor.

In column 6, line 6, delete "FIGS." and insert -- FIG. --, therefor.

In column 6, line 58, after "and" delete "I" and insert -- i --, therefor.

In column 6, line 65, after "The" insert -- start --.

In column 7, line 2, delete "$F_i^k\text{-}1$" and insert -- $F_i^{k-1}$ --, therefor.

In column 7, line 43, after "time" delete ", in" and insert -- . In --, therefor.

In column 8, line 1, delete "This" and insert -- this --, therefor.

Signed and Sealed this

Seventh Day of April, 2009

JOHN DOLL
*Acting Director of the United States Patent and Trademark Office*